United States Patent [19]
Tuccio et al.

[11] 3,913,033
[45] Oct. 14, 1975

[54] CW ORGANIC DYE LASER

[75] Inventors: Sam A. Tuccio; Otis G. Peterson, both of Rochester, N.Y.

[73] Assignee: Eastman Kodak Company, Rochester, N.Y.

[22] Filed: July 1, 1974

[21] Appl. No.: 484,726

Related U.S. Application Data

[63] Continuation of Ser. No. 117,595, Feb. 22, 1971, abandoned, which is a continuation-in-part of Ser. No. 51,790, July 2, 1970.

[52] U.S. Cl. .................... 331/94.5 L; 331/94.5 C
[51] Int. Cl.² ........................................ H01S 3/20
[58] Field of Search ............... 331/94.5; 330/4.3; 252/301.3 R

[56] References Cited
UNITED STATES PATENTS
3,055,257   9/1962   Boyd et al. .................... 331/94.5

OTHER PUBLICATIONS
Snavely, Flashlamp–Excited Organic Dye Lasers, Proc. IEEE, Vol. 57, No. 8, (Aug. 1969), pp. 1374–1390.
Stepanov et al., Lasers Based on Solutions of Organic Dyes, Soviet Physics, Vol. 11, No. 3, Nov.–Dec. 1968), pp. 304–318.
Pappalardo et al., Long Pulse Laser Emission From Rhodamine 6G Using Cyclooctatetraene, Appl. Phys. Let., Vol. 16, No. 7, (April 1, 1970), pp. 267–268.
Snavely, Dye Lasers, S.P.I.E. Journal, Vol. 8, (May 1970), pp. 119–125.

*Primary Examiner*—William L. Sikes
*Attorney, Agent, or Firm*—D. I. Hague

[57] ABSTRACT

A method and apparatus for producing continuous emission from a lasing medium comprising organic dye molecules in solution. Continuous emission is accomplished by flowing the medium through a focused optical cavity while simultaneously producing a population inversion in that portion of the medium flowing in close proximity to the focal point of the cavity. The population inversion is produced by pumping the medium longitudinally, along the optical axis of the cavity, preferably by the focused output of a continuous-wave argon laser. Sufficient thermal energy is continuously dissipated from the medium to maintain the optical homogeneity thereof at or above the quality required for continuous emission.

30 Claims, 5 Drawing Figures

CW ORGANIC DYE LASER

This is a continuation, of application Ser. No. 117,595, filed Feb. 22, 1971 and now abandoned, which is a continuation-in-part of our copending application Ser. No. 51,790, entitled "CW Organic Dye Laser", filed July 2, 1970.

BACKGROUND OF THE INVENTION

The present invention relates to lasers and particularly to an organic dye laser having the unique capability of continuous emission.

During the last decade, considerable attention was focused on the problems attendant the task of providing a continuous wave (CW) laser having the capability of being continuously spectrally turned over a relatively broad band of wavelengths within the optical spectrum; i.e., the ultraviolet, visible and near-infrared spectral regions. Such attention was undoubtedly stimulated, in part, by the expressed interests of those who foresaw a myriad of scientific and commercial applications in such fields as spectroscopy, communications, photo-chemical manufacture, image-recording, etc. Notwithstanding intense interest and efforts, however, little headway was made for several years in providing practical solutions to the problems presented. Granted, a vast array of new lasing materials was discovered during the first six years of laser technology, many being adapted for use in CW laser systems; however, the fluorescence spectra of such materials, being primarily based upon atomic transitions in the visible portion of the spectrum, constituted lines and, as such, presented no possibility of continuous tunability in the visible spectrum.

In 1966, a significant stride toward the final solution of a CW tunable laser was made when P. P. Sorokin and J. R. Lankard demonstrated that coherent radiation could be stimulated from fluorescent organic dyes in solution. See IBM Journal, Vol. 10, p. 162 (1966). Unlike the fluorescence of other lasing materials, the fluorescence of organic dyes is broadband, commonly spanning several hundred angstrom units within the 0.2 to 1.2 micron spectral range. Such broadband fluorescence, being based upon molecular rather than atomic transitions, enables the so called "dye laser" to be spectrally tuned to any wavelength within a substantial portion of its fluorescence band. Because of the vast number of organic dyes and the fact that each dye has a unique fluorescence band, the dye laser has received wide acclaim as being the first truly tunable laser capable of operating throughout the optical spectrum.

In the Sorokin and Lankard experiments, laser action was accomplished by arranging the dye solution within a conventional parallel reflector cavity and pumping the solution by the output of a giant pulse or Q-switched ruby laser. Because of the pulse duration of the pumping source, laser action in the dye solution was limited to less than a microsecond. Thus, the dye laser of Sorokin and Lankard, although spectrally tunable, represented only a partial solution to the above-identified task.

Heretofore, despite innumerable efforts, continuous-wave operation of an organic dye laser has never been achieved. Generally, the barriers confronting CW operation have been twofold. First, it is generally accepted that the uncontrolled accumulation of molecules in the metastable triplet state will prevent dye laser emission for more than a few microseconds in duration. See, for insstance, an article entitled "Flashlamp Excited Organic Dye Lasers" by B. B. Snavely, published in the proceedings of the *IEEE*, Vol. 57, No. 8 (1969). As is well known, stimulating emission from fluorescing organic dyes relies on radiative transitions taking place as molecules in the excited singlet state return to the ground singlet state. Rather than returning directly to ground from the excited state, however, there is a small probability that molecules will return indirectly by undergoing radiationless transitions from the excited singlet to a lower-lying triplet state and then to ground. Such radiationless transitions obviously compete with the laser process and thereby represent losses to the system. That is to say, energy used to pump or excite molecules to a state from which lasing may occur is wasted if molecules return to ground via the triplet state. While the probability of transitions from the singlet to triplet state is small, the probability of transitions from the triplet state to ground is almost equally as small. Thus, the triplet state tends to act as a trap for excited molecules and thereby depletes the supply of molecules available for the laser process.

In addition to depleting the supply of molecules, the triplet state is also detrimental to the laser process in that transitions within the triplet manifold (i.e. triplet-triplet transitions) are spin-allowed and the optical absorption associated with these transitions is strong. Unfortunately, the corresponding absorption band generally overlaps the singlet state fluorescence spectrum. Consequently, the accumulation of molecules in the triplet state produces large optical losses at the wavelengths for which laser emission is most probable. In fact, the absorption associated with triplet-triplet processes can be strong enough to quench or even prevent laser emission in less than a microsecond.

Fortunately, recent experiments have shown that it is possible to chemically quench the triplet state lifetime (the reciprocal of the probability of triplet-singlet transitions) of many organic dyes to a time sufficiently short as to prevent the buildup of a triplet state concentration large enough to prevent continuous operation; see, for instance, an article by B. B. Snavely and F. P. Schäfer, entitled "Feasibility of CW Operation of Dye Lasers", Physics Letters, Vol. 28A, No. 11, (1969). By the addition of molecular oxygen, for example, to several known organic dye solutions, the lifetime of the triplet state of the dye can be reduced to permit the molecules, normally trapped in the triplet state, to rapidly return to the ground state in a time sufficiently short to permit continuous laser emission. Similar results in attempts at triplet life-time quneching have been obtained by employing cyclooctatetraene as a triplet quencher in ethanol solutions of the organic dyes rhodamine 6G and B, and by employing anthracene in ethanol solutions of dichlorofluoroescein. The effectiveness of chemical quenching is, of course, strongly dependent on the probability of singlet to triplet transition as well as the responsiveness of the triplet state to the particular quenching additive. In other words, the intersystem crossing rate can be so high that no amount of additive or no known additive will suffice to sufficiently quench the triplet state concentration.

However, in addition to quenching the lifetime of the triplet state by chemical additives, another method of coping with triplet-state losses is to physically prevent the buildup of triplet-state molecules in the active or pumped volume of the laser cavity. It has been found that an accumulation of triplet-state molecules can be prevented to some extent if not entirely by simply flowing the dye solution through the active volume at a high velocity. This technique has the effect of maintaining the population density of molecules in the triplet state at a low value relative to singlet-state molecules, thereby minimizing absorption losses and maximizing the number of molecules available for laser action. The only drawback to this approach is that its utility is to some extent limited to lasers in which the active volume is relatively small. It has been found that the lifetime of the triplet state in the active region of the laser cavity must be limited to times of the order of or less than a microsecond. For "mechanical", as opposed to "chemical", quenching, the rate of flow through the active volume must be such that the dye molecules traverse the active region in this length of time. Where the dimension to be traversed is of the order of a millimeter or more, relatively high pressure is required to achieve the required transit time. However, in the case of focused cavities, it has been found that the pressures required for producing such transit times are not at all impractical. In fact, by combining the chemical and mechanical approaches to triplet quenching, it is possible to vastly extend the number of dyes adapted for use in CW systems far beyond those particular dyes whose triplet lifetime can be sufficiently reduced by either approach alone.

From the foregoing, it is apparent that optical losses associated with the metastable triplet state have been effectively overcome and presently present no major barrier to sustained laser action. However, the second barrier to continuous wave operation, that being the problem of overcoming optical losses produced by thermal effects introduced during pumping, has never been heretofore solved and is thus the subject of concern of the present invention.

It is basic that, in order for any active medium to lase continually, it is essential (1) to continuously maintain a population inversion in at least a portion of the active medium, and (2) to continuously stimulate emission of photons from that portion of the medium wherein the population inversion is created by bombarding it with a sufficient percentage of those photons emitted at the lasing frequency as to maintain the power density required for the critical inversion within the capability of the excitation or pumping source. The basic problem in providing these essentials for organic dye lasers is the problem of maintaining, during continued pumping, the requisite optical homogeneity in the active medium as to permit (1) the power density of the excitation radiation to remain at or above the threshold value required for producing the necessary population inversion, and (2) a sufficient fraction of those photons emitted at the lasing frequencies to be redirected, by the reflective members of the optical cavity, back through the excited medium so as to maintain constant the power density threshold required for lasing. During operation, the molecules absorb radiation provided by the source of excitation and thereby become excited into upper states. As is well known, the transition of these excited molecules back to the ground state include radiative transitions, in which photons are given off, as well as radiationless transitions, in which thermal energy is given off. A non-uniform addition of thermal energy to the active medium produces thermal gradients in the medium which, in turn, give rise to refractive index gradients or optical inhomogeneities. Such gradients disrupt the uniform propagation of energy in the medium and thereby produce critical losses in the power density of the excitation source and in the percentage of photons available for stimulating further emission. To date, these losses have not been reduced to a level required for CW operation.

SUMMARY OF THE INVENTION

The primary object of the present invention then is to provide a laser having the capabilities of continuous emission and continuous spectral tunability.

Another object of the invention is to provide an organic dye laser having the unique capability of continuous emission of coherent radiation at a wavelength which is tunable over a substantial portion of the fluorescence band of the particular organic dye comprising the lasing medium.

Still another object of the invention is to provide a tunable liquid laser which is capable of emitting coherent radiation having a narrow spectral bandwidth, substantially less than 1 angstrom unit, selectable within a band pass of several hundred angstrom units.

Still another object of the present invention is to provide a method for continuously producing stimulated emission from a solution of organic dye molecules.

The CW dye laser of the invention comprises a focused resonant cavity (e.g., hemispherical, spherical or confocal cavities) having a relatively small active volume. The cavity is adapted to permit longitudinal excitation of fluorescent organic dye solution disposed therein. Excitation radiation is introduced from a continuous energy source, such as an argon-ion CW laser, into the dye solution through one of the reflective mirrors comprising the cavity and is focused within the active volume of the cavity at a power density sufficient to produce the necessary number of excited molecules. To dissipate thermal energy generated during pumping, and thereby maintain substantially constant the optical homogeneity of the dye solution, the transparent dye cell windows, through which pumping energy is introduced into the active medium, preferably comprise a material of relatively high thermal conductivity, such as sapphire, diamond, or beryllium oxide. The maintenance of optical homogeneity is also assisted by the use of a dye solvent whose refractive index changes only slightly with temperature and by a pumping and heat exchanging apparatus whereby the dye solution may be advanced through the excited region of the cavity at a rapid rate and cooled before being recirculated through the cavity. Such circulating apparatus may also serve to assist in reducing optical losses produced by the metastable triplet state of the dye molecules.

The above and other objects of the invention, its nature and its various advantages, can be more readily understood by referring to the accompanying drawings and to the detailed description thereof which follows.

DETAILED DESCRIPTION OF PREFERRED EMBODIMENTS

Figure 1:
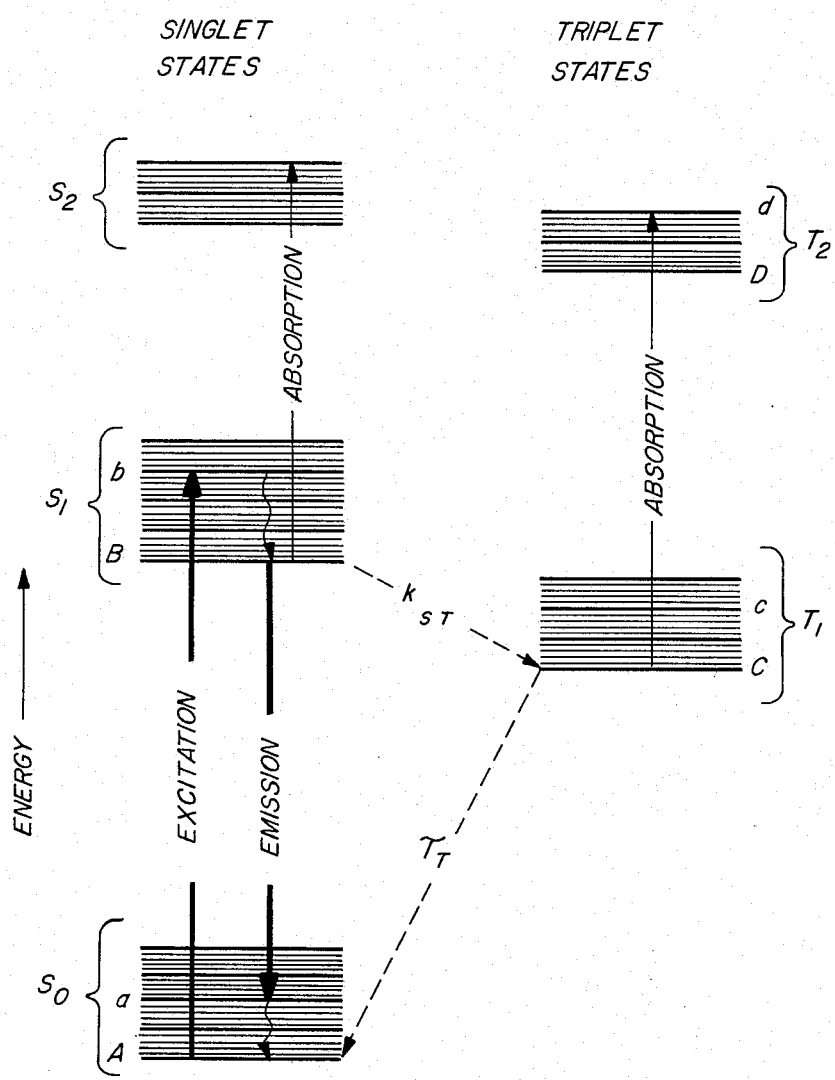
FIG. 1 is a schematic representation of the energy levels of an organic dye molecule.

To define certain terms referred to subsequently herein, and to schematically illustrate those properties of an organic dye molecule which affect its capability to fluoresce over a continuum of wavelengths, an energy level diagram is presented in FIG. 1. The heavy horizontal lines represent the vibrational states of the dye molecule and the lighter horizontal lines represent its fine structure. Absorption of pumping or excitation energy and laser emission are represented by the transitions A → b and B → a, respectively. Other transitions represent losses in the laser process.

The electronic ground state of the molecule is a singlet state, designated as $S_0$, which spans a range of energies determined by the quantized vibrational and rotational exictation of the molecule. The energy spacing between the vibrational levels is typically of the order of 1400 to 1700 $cm^{-1}$. The energy spacing between rotational levels, being smaller than the spacing between vibrational levels by a factor of approximately 100, provide a near continuum of states between the vibrational levels. The first and second excited singlet and triplet states are designated as $S_1$, and $S_2$, and $T_1$ and $T_2$, respectively.

Like the electronic ground state, each excited electronic state of the molecule consists of a similar continuum of energy levels, and optical transitions between these electronic levels give rise to the broad absorption and emission spectra characteristic of the dye molecule.

As the first step of the laser process the molecules are excited from the lowest levels of the ground singlet state $S_0$ to higher vibrational-rotational levels of the first excited singlet state $S_1$ by absorbing radiation provided by an excitation or pumping source. Such excitation is commonly provided by illuminating the dye molecules with the output of a flashlamp or with the beam of another laser having suitable spectral characteristics. As stated above, molecular excitation is indicated by the transition A → b. The molecular energy then decays nonradiatively to level B, a lower level of the $S_1$ state, as indicated by the wavy line between b and B. The laser emission results from the stimulated transition between levels B and a. Level a is a higher lying vibrational-rotational state of $S_0$. The laser process is then terminated by the nonradiative decay between a and A, the lowest possible singlet state.

Before coherent emission can be produced from the organic dye media, the concentration of molecules in the excited singlet state $S_1$ must reach a certain minimum value, commonly referred to as the "critical inversion", the magnitude of which depends upon the losses of the complete laser system.

The decay of radiation emitted in the spontaneous singlet-state process B → a, known as fluorescence, is governed by the lifetime $\tau$ of state B. As used hereinafter, $\tau$ will be taken as the exponential decay lifetime for the fluorescence of the large number of excited dye molecules. For organic dye molecules, $\tau$ is typically about $5 \times 10^{-9}$ seconds.

The photon energy for which the optical absorption of the molecule is a maximum is greater than the photon energy at the fluorescence maximum. Thus, the absorption band is centered at a shorter wavelength than the fluorescence band. The difference in energy between absorption and emission processes is taken up by the radiationless transitions b → B and a → A. The separation between fluorescence and singlet absorption spectra is important for the dye laser since the unexcited dye is then substantially transparent to radiation within the fluorescence band.

As previously indicated, transitions other than those between the excited and ground singlet states represent losses to the system. By far the most serious losses occur when molecules in the excited singlet state attempt to return to the ground singlet state via a lower-lying triplet state. This indirect process of decay, commonly known as intersystem crossing, is detrimental to laser action for several reasons.

First, and most obvious, intersystem crossing competes with fluorescence in de-energizing the excited singlet state. Thus, molecules are depleted from the excited singlet state which would otherwise be available for laser emission. Secondly, since singlet-triplet and triplet-singlet transitions are spin-forbidden, the probability of intersystem crossing, governed by the intersystem crossing rate constant $k_{ST}$, is quite small and the lifetime of the triplet state $\tau_T$ correspondingly large. The actual value of $\tau_T$ depends upon experimental conditions; for a carefully degassed and purified dye solution, a lifetime of $10^{-3}$ second is typical. Since the triplet lifetime is usually several orders of magnitude longer than the fluorescence lifetime, the triplet state tends to act as a trap for excited molecules and thereby depletes the number of molecules available for the laser process. Thirdly, triplet-triplet transitions are spin-allowed, and the corresponding strong absorption band generally overlaps the singlet state fluorescence spectrum. Consequently, the accumulation of molecules in the triplet state produces large optical losses at the wavelengths at which laser emission is most probable.

Optical absorption between excited singlet states, such as the process connecting $S_1$ and $S_2$ in FIG. 1, is also a possible source of optical loss in the dye laser. The importance of this process is difficult to assess, however, since little information has been gathered to date.

From the foregoing discussion it is readily apparent that triplet-state losses are extremely detrimental to continuous laser action. If unchecked, such losses are capable of quenching laser emission in less than a microsecond after emission commences, no matter what dye molecules comprise the active medium. Presently, our most effective method of controlling triplet-state losses is to introduce an additive into the dye solution which serves to, in effect, shorten the triplet state lifetime (i.e., increase the probability of $T_1 \rightarrow S_0$ transitions) to a value which prevents accumulation of molecules in the triplet state. For many dyes, the addition of molecular oxygen serves this purpose. Usually, sufficient oxygen can be added by simple aerating the dye solution. The triplet state of other dyes, such as certain members of the fluorescein family, respond to the addition of anthracene to the dye solution. Moreover, triplet-state losses can also be controlled by physically reducing the ratio of triplet-to-singlet-state molecules in the active volume. This can be accomplished by flowing the active medium through the active volume at a rate such that the transit time through the active volume is reduced to a value equal to the triplet state lifetimes achieved with chemical quenching. A derivation of the theoretical upper limit for the triplet-state lifetime within the active volume of the laser cavity is provided below.

With reference to an article entitled "Intersystem Crossing Rate and Triplet State Lifetime for a Lasing Dye", by J. P. Webb et al., published in J. Chem. Phys., Vol. 53, (1970), the optical gain G of any dye laser of cavity length $x$ at wavelength $\lambda$ may be defined by the expression (1) $G = N^* \sigma_g(\lambda) - N_o \sigma_s(\lambda) - N_T \sigma_T(\lambda) - L/x$, where L is the extrinsic loss incorporating all intracavity losses except the dye absorbances and is assumed independent of wavelength over the tuning range, $N^*$, $N_0$ and $N_T$ are the numbers of molecules in the excited singlet state, the singlet ground state and the triplet ground state, respectively, $\sigma_g(\lambda)$ and $\sigma_s(\lambda)$ and $\sigma_T(\lambda)$ are the stimulated emission cross section, molecular singlet and triplet absorption cross sections, respectively. G is a Beer's law gain coefficient defined in terms of the ratio of an incident photon flux $I_o$ to a final photon flux $I_f$ after one round trip through the cavity.

The stimulated emission cross section, $\sigma_g(\lambda)$, can be shown to be proportional to the singlet fluorescence line shape $F(\lambda)$ and the fourth power of the wavelength and inversely proportional to the fluorescence lifetime $\tau$ or (2) $$g(\lambda) = \frac{\lambda^4 F(\lambda)}{8 \pi \tau c N^2}$$

where the fluorescence line shape is normalized so that $\int_0^\infty F(\lambda) d\lambda = \Phi$ (quantum yield) and c is the velocity of light in a vacuum and N is the refractive index of the dye solution.

Since the ratio of the number of molecules in the triplet state $N_T$ to the number in the excited singlet $N^*$ is approximately equal to the ratio of the transition probability out of the triplet state, $k_{ST}$, to the transition probability out of the triplet state, $1/\tau_T$, it is apparent that the number of molecules in the triplet state can be expressed as (3) $N_T = N^* k_{ST} \tau_T$
where $\tau_T$ is the triplet state lifetime.

Substituting equation (3) in the gain equation (1) it is apparent that $G(\lambda) = N^*(\sigma_g(\lambda) - k_{ST}\tau_T\sigma_T(\lambda)) - N_o\sigma_s(\lambda) - L/x.$ It is quite clear that, in order for there to be photon production or gain in the laser the coefficient of $N^*$ must be positive or $\sigma_g(\lambda) - k_{ST}\tau_T\sigma_T(\lambda) > 0$ stated otherwise, (4) $$\frac{\sigma_g(\lambda)}{k_{ST} \tau_T \sigma_T(\lambda)} > 1$$

This criterion must be met at some wavelength if a dye solution is to lase continuously. Equation (4) presents the theoretical limit for continuous emission. By substituting equation (2) in equation (4) it may be shown that $$\frac{\lambda^4 F(\lambda)}{8 \pi c N^2 k_{ST}\tau_T\sigma_T(\lambda)} > 1$$

By simply solving for the triplet-state lifetime $\tau_T$, it may be shown that the triplet-state lifetime within the active volume must be less than (5.) $$\frac{\lambda^4 F(\lambda)}{8\pi c N^2 \tau k_{ST}\sigma_T(\lambda)} \text{ seconds,}$$

in order to render continuous emission feasible at wavelength $\lambda$. Such a lifetime, although rarely, if ever, this short in duration in a pure dye solution, can be achieved by the aforementioned chemical and mechanical quenching techniques.

Figure 2:
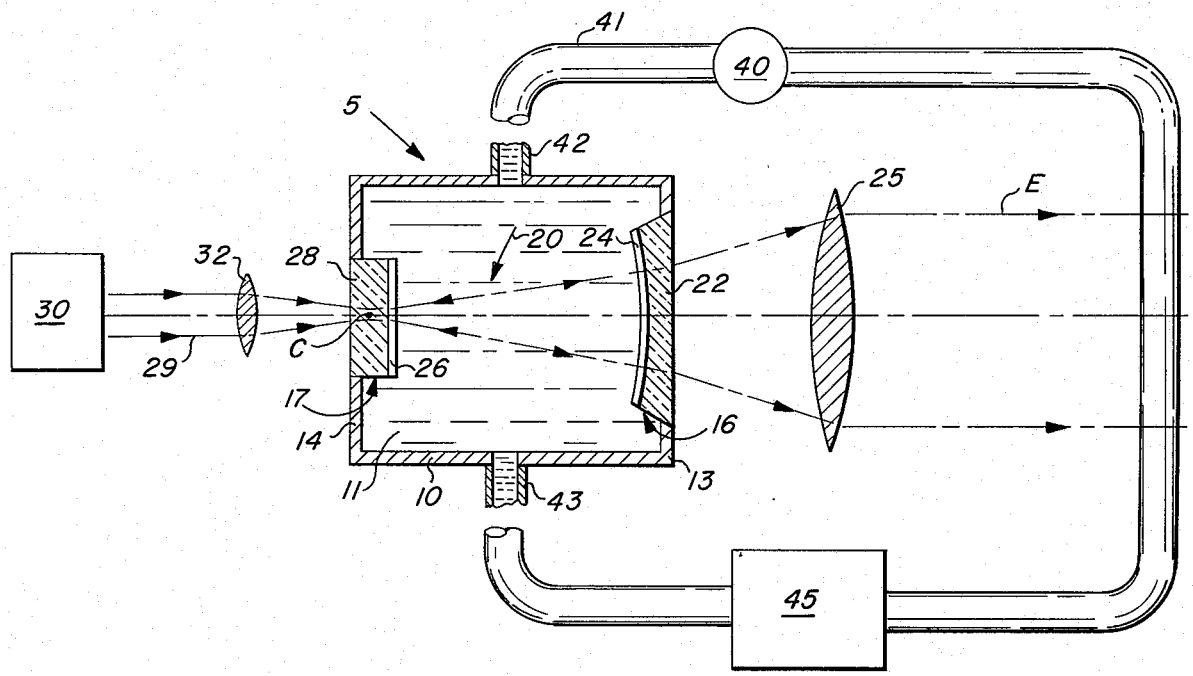
FIG. 2 is a schematic view of a CW organic dye laser system in accordance with a preferred embodiment.

Referring now to FIG. 2, a continuous-wave dye laser 5 according to a preferred embodiment is shown to comprise a stainless steel dye cell 10 wherein a fluorescent organic dye solution 11 is contained. Disposed in opposing walls 13 and 14 of the dye cell are mirrors 16 and 17, respectively, which together define a hemispherical resonant optical cavity 20. Mirror 16 is spherically concave toward mirror 17 and comprises a spherically concave support plate 22, fabricated from dense flint or the like, and a reflective dielectric coating 24 which is highly, but not totally, reflective to electromagnetic radiation within the fluorescence band of the dye solution; i.e., the wavelengths at which laser action is possible. Preferably, the concave mirror 16 transmits approximately 2% of radiation within such fluorescence band. In this manner dye laser emission E can be extracted from the cavity and collimated by collimating lens 25. Spaced from the concave mirror 16 slightly within the center of curvature c thereof is a reflective dielectric coating 26 which, together with its optically flat support plate 28, comprises mirror 17. While the reflectance of coating 26 is nearly 100% over the fluorescence band of the dye solution, it is relatively transparent to radiation within the absorption band of the dye solution, preferably transmitting 75% or more of such radiation. Like its coating, support plate 28 also comprises a material highly transparent to radiation within the dye solution absorption band. In this manner, radiation 29 emanating from an external continuous-wave source 30 having a spectral distribution adapted to excite the dye molecules comprising the dye solution can enter the dye cell. External source 30 preferably comprises a CW laser.

Figure 3:
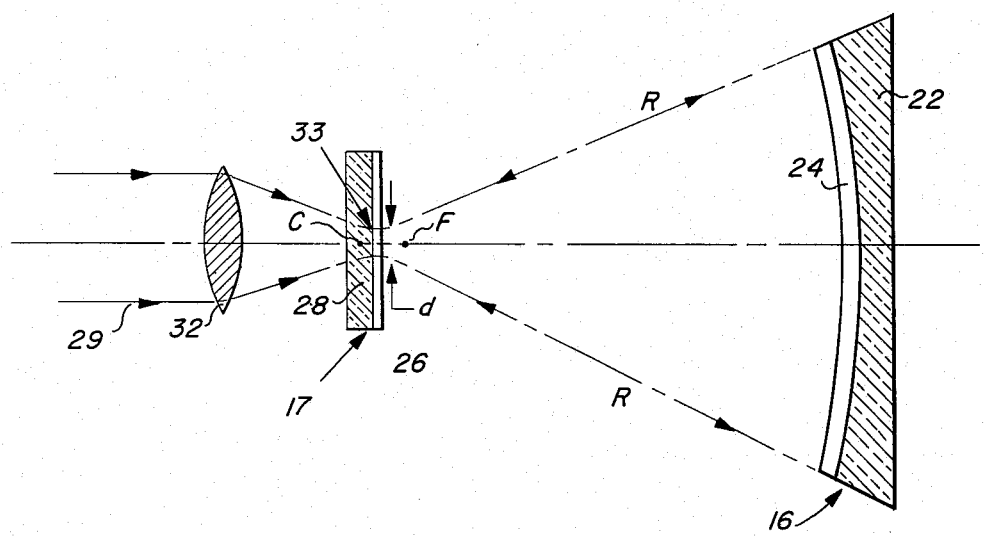
FIG. 3 is a magnified view of the active volume of the laser cavity.

As best illustrated in FIG. 3 wherein the optical cavity is magnified and slightly exaggerated for clarity, excitation energy emanating from CW source 30 is focused by condensing lens 32 of focal length F substantially on the surface of coating 26 to form a diffraction limited waist 33 having a minimum diameter $d$ at the inner surface of coating 26. The power density of such excitation energy at the inner surface of coating 26 must be sufficient to produce a population inversion in the dye solution. The geometrical parameters of concave mirror 16 and its spacing from mirror 17 are chosen such that its mode volume (i.e. its diffraction limited waist) is substantially identical to that of lens 32 at or near the inner surface of coating 26. This "mode matching" technique assures that the excitation energy and the laser emission will diverge in approximately the same manner so the absorption of excitation energy will occur within the laser mode. The mode volume of the laser cavity, that portion of the cavity through which stimulated photons of the lasing wavelength travel, is defined by radii R of concave mirror 16 and the distance between mirrors 16 and 17. However, that part of the mode volume in which a population inversion is actually produced, the so-called "active volume", extends from the inner surface of coating 26 only a short distance toward concave mirror 16. This distance (i.e. the length of the active volume) is determined by the concentration of dye molecules within the mode volume. Preferably, the dye concentration is adjusted such that substantially all of the incident excitation energy is absorbed before the focused beam of excitation energy diverges significantly.

With respect to the dye solution, as indicated previously, it may comprise any fluorescent organic dye whose triplet-state lifetime within the active volume of the cavity can be quenched, either by chemical or mechanical techniques or by a combination of both, to a time less than that set forth in equation (5) above. If the triplet lifetime can be maintained at less than such a value, then the dye is theoretically capable of continuously sustaining the population inversion required for laser emission. With respect to the solvent per se, it must be capable of reducing the dye molecules to monomeric form. Moreover, the solvent must be substantially transparent to those radiation bands emitted and absorbed by the dye molecules and preferably possess thermal properties such that its refractive index changes little with temperature variations. A particularly useful and readily available solvent having such characteristics is water containing a sufficient amount of deaggregating agents (e.g. surfactants or detergents) to reduce aggregated dye molecules to the required monomeric form. Such solvents are disclosed in a commonly assigned application Ser. No. 24,027 filed Mar. 30, 1970 in the names of A. H. Herz et al.

To dissipate thermal energy from the active volume resulting from absorption of excitation energy, and to assist or accomplish the quenching of triplet-state losses, means are provided for constantly circulating the dye solution through the dye cell at a rapid rate. Such circulation is accomplished by a pump 40 arranged in a conduit 41 which connects inlet and outlet ducts 42 and 43, respectively, formed in opposing walls of the dye cell. A heat exchanger 45, such as an ice bath, is arranged in conduit 41 to lower the temperature of the dye solution before being recirculated through the cavity. To further dissipate thermal energy from the active volume, to prevent thermal damage to coating 26 and to reduce optical inhomogeneities in the support plate, the optically falt support 28 is preferably fabricated from a transparent material having a relatively high coefficient of thermal conductivity. Support 28 thus tends to act like a "heat sink" for thermal energy in the laser systems. Sapphire, diamond or beryllium oxide are suitable materials for support plate 28.

The thermal dissipation provided by the recirculation of the dye solution and by the heat sink support plate 28 serves to constantly maintain the focusing properties (i.e. the optical homogeneity) of the dye solution and support plate 28 at a quality required for continuous laser emission. Not only must the excitation energy be constantly focused in the dye solution at or above the power density threshold required for a population inversion, but also a sufficient percentage of those photons emitted by the molecules in the active volume must be redirected back toward and refocused within the active volume in order to achieve continuous laser emission.

The following table is provided to show some representative organic dye solutions which, when employed in an apparatus of the type described above and excited by the output of a continuous-wave argon-ion laser, emitted coherent radiation on a continuous basis. With the exception of disodium fluorescein, all dye solutions were excited by the 5145A line of the argon laser. Disodium fluorescein was excited by the 4880 A line. The output of the argon laser had a $TEM_{oo}$ intensity profile with a $1/e^2$ diameter of 2 mm., and a microscope objective having a 32 mm. focal length was used to focus the argon laser beam within the dye laser cavity. Chemical quenching of the triplet-state lifetime was primarily relied upon to reduce triplet losses, although circulation of the dye solution through the active volume during excitation did assist to some extent. Of the particular dyes listed, the triplet-state lifetime of all but the fluorescein dyes were effectively quenched by simply aerating the solution, molecular oxygen at a concentration of approximately $0.2 \times 10^{-2}M$. serving as the triplet quencher. To quench the triplet of the fluorescein dyes, anthracene or cyclooctratetraene were added. The radius of curvature of concave mirror 16 was 4.55 mm. and the spacing between the reflective coatings of mirrors 16 and 17 was adjusted to approximately 4.53 mm., approximately 0.02 mm. closer than the spacing for perfect hemispherical focus. The mode diameter of lens 32 and concave mirror 16 at the surface of coating 26 was calculated to be approximately 12 microns. The dye solution was flowed through the active volume, substantially perpendicular to the cavity axis 46 at velocities between 200 and 600 cm./sec. Such flow rates produced transit times through the active volume of approximately 6–18 microseconds, approximately an order of magnitude less than the transit time required for

| Dye | Solvent | Dye Concentration (Molar) | Input Power Density at Threshold[c] | Wavelength Peak |
| --- | --- | --- | --- | --- |
| Rhodamine 6G | Water plus 1.5%[A] Triton X100[B] | $2.0 \times 10^{-4}$ | 55 kilowatts/cm$^2$ | 5970A |
| Rhodamine 6G | Water plus 2% Ammonyx LO[D] | $2.5 \times 10^{-4}$ | 50 kilowatts/cm$^2$ | 5930A |
| Rhodamine 6G | Water plus 25% hexafluoroisopropanol | $1.5 \times 10^{-4}$ | 80 kilowatts/cm$^2$ | 5730A |
| Rhodamine B | Water plus 25% hexafluoroisopropanol | $2.5 \times 10^{-4}$ | 100 kilowatts/cm$^2$ | 6100A |
| Dichlorofluorescein | Ethanol plus sodium hydroxide[E] plus anthracene[F] at $2 \times 10^{-2}M$. | $2.0 \times 10^{-4}$ | 150 kilowatts/cm$^2$ | 5700A |

—Continued

| Dye | Solvent | Dye Concentration (Molar) | Input Power Density at Threshold[c] | Wavelength Peak |
|---|---|---|---|---|
| Disodium Fluorescein | Ethanol plus cyclooctratetraene[f] at $5\times10^{-2}$M. | $2.0 \times 10^{-4}$ | 900 kilowatts/cm$^2$ | 5550A |
| Disodium Fluorescein | Ethanol plus 25% toluene plus Anthracene[f] at $2 \times 10^{-2}$M. | $2.0 \times 10^{-4}$ | 900 kilowatts/cm$^2$ | 5550A |
| Tetrachlorofluorescein | Ethanol plus Cyclooctratetraene[f] at $5 \times 10^{-2}$M. | $2.0 \times 10^{-4}$ | 1.5 megawatts/cm$^2$ | 5820A |
| Tetrachlorofluorescein | Ethanol plus 25% Toluene plus Anthracene[f] at $2 \times 10^{-2}$M. | $2.0 \times 10^{-4}$ | 1.5 megawatts/cm$^2$ | 5820A |

A-percentages are by volume
B-octyl phenoxy polyethoxy ethanol
C-approximate threshold measured at a dye solution flow rate of 600 cm/sec through the active volume.
D-lauryl dimethylamine oxide
E-amount sufficient to make solution slightly basic
F-chemical additive for triplet quenching total triplet quenching without using chemical additives. The concentration of the dye was adjusted so as to totally absorb the excitation radiation within a distance of approximately 0.2 mm. from the mirror coating 26.

Figure 4:
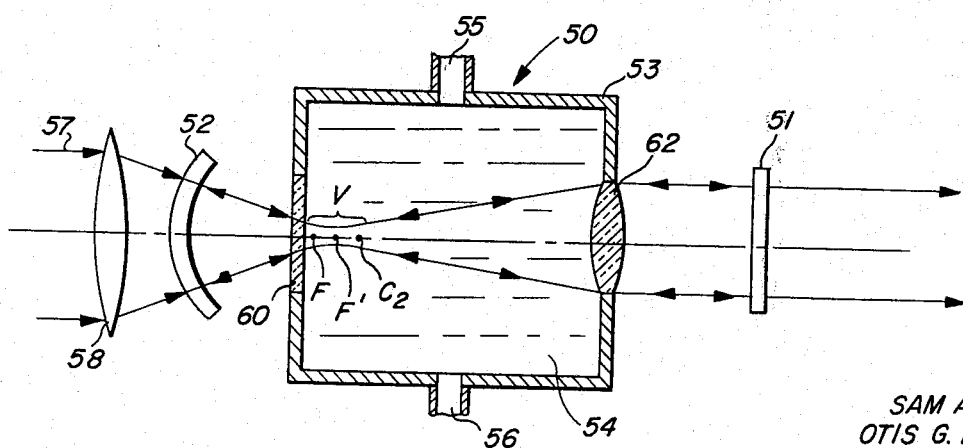
FIG. 4 is a schematic illustration of another embodiment in which the cavity mirrors are disposed outside the dye cell.

Another continuous-wave liquid laser 50 embodying the invention is illustrated in FIG. 4, such laser comprising a focus cavity having a substantially spherical configuration. Confirmation that this cavity configuration is useful in producing continuous-wave emission from an organic dye laser was recorded by M. Hercher and H. A. Pike in Optics Communications, Volume 3, No. 1 (March, 1971). As shown, the cavity mirrors 51 and 52 are disposed outside the dye cell 53. The fluorescent dye solution 54 is circulated through the dye cell by a pump (not shown) disposed in a conduit connecting inlet and outlet ports 55 and 56, respectively. Excitation energy 57 generated by an appropriate continuous-wave source is focused by condensing lens 58 within the dye cell, through cavity mirror 52 and dye cell window 60. The focal point F' of condensing lens 58 is preferably adjusted to the midpoint of the active volume V of the laser cavity. Concave cavity mirror 52 serves to collect photons diverging from the active volume through dye cell window 60, and to redirect such photons back toward its center of curvature $C_2$ which is situated in the active volume. A collimating lens 62, arranged in the wall of the dye cell, serves to collimate photons diverging from the active volume toward cavity mirror 51, causing them to stroke mirror 51 perpendicularly and be redirected thereby toward the focal point F of lens 62 which is also situated within the active volume. It should be noted that the combination of lens 62 and mirror 51 is the "thick mirror" equivalent to the concave mirror 16 in the FIG. 2 embodiment. Mirror 51 is designed to be slightly transparent to photons of the lasing wavelengths so as to permit a portion of the dye laser emission 63 to be extracted from the cavity for utilization.

As shown in FIG. 4, the center of curvature of mirror 52 and the focal point of lens 62 overlap within the active volume of the cavity. Such overlapping reduces diffraction losses and produces a stable optically resonant cavity configuration; i.e., a cavity in which emitted photons do not "walk-off" the cavity mirrors upon repeated reflections. In the hemispherical cavity depicted in FIGS. 2 and 3, a stable cavity configuration was achieved by adjusting the concave mirror such that its center of curvature was situated behind flat mirror 17. In this manner, the center of curvature of the mirror image overlaps the center of curvature of the concave mirror.

Although the particular cavity configuration illustrated in FIG. 4 is "aspherical" in nature, the radius of curvature of mirror 52 and the focal length of lens 62, being unequal, it should be readily apparent that continuous dye laser emission could also be achieved in a spherical, or even confocal cavity configuration. In such configurations, the inner surface of dye cell window 60, as in the aspherical cavity of FIG. 4, would be arranged adjacent to the active volume of the cavity in order to minimize absorption losses in the active medium. Because of the substantial thermal energy created within the active volume, the dye cell window 60 should be fabricated in such a manner and from such a material as to possess a low heat storage capability. In this way, thermal energy in the active volume and in the window can be rapidly dissipated so as to maintain the focusing properties of the window and the dye solution at the quality required for continuous laser action. One of the advantages gained by using spherical and aspherical cavities is that the active volume thereof can be twice as long as that of the hemispherical cavity which provides a larger volume in which to dissipate heat and permits lower dye concentrations.

Figure 5:
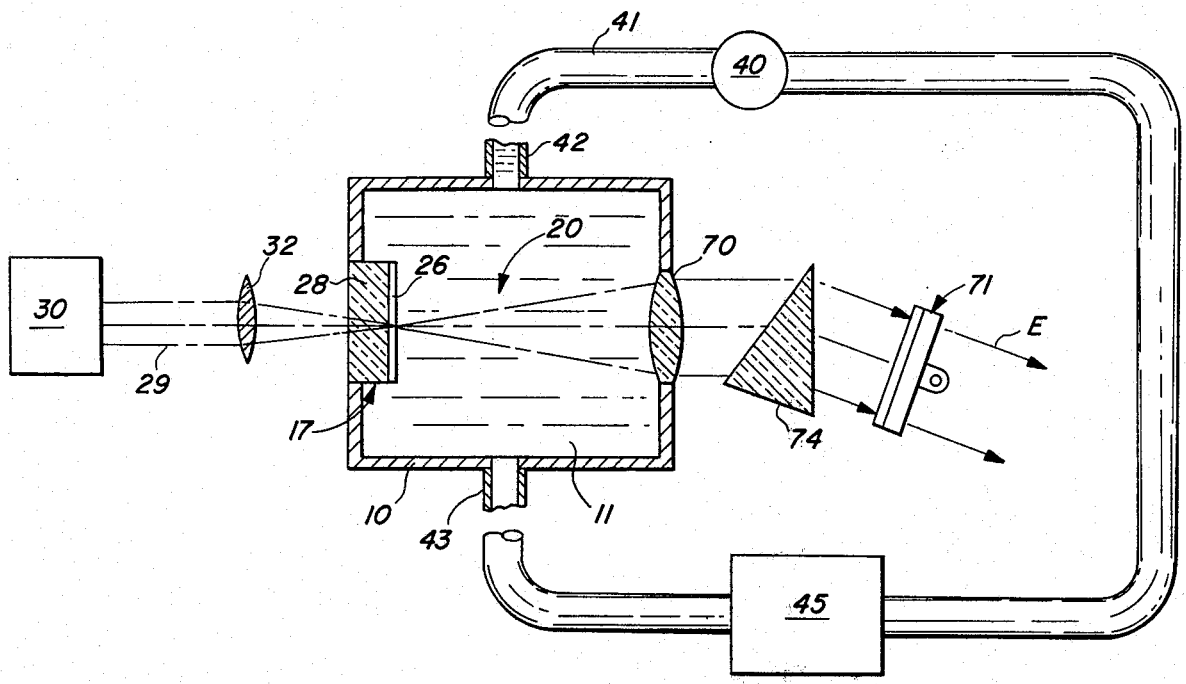
FIG. 5 is a schematic view of a tunable CW organic dye laser according to another embodiment of the invention.

Referring now to FIG. 5, a continuous-wave dye laser including means for spectrally tuning the wavelength of its emission E is shown. Basically, the dye laser is of the type illustrated in FIG. 2, concave mirror 16 being replaced by its thick mirror equivalent, collimating lens 70 and mirror 71. For simplicity, mirror 71 is illustrated as a flat mirror; actually, in order to return photons to the active volume it must be concave to some extent since the laser emission will always continue to diverge slightly after passing through the collimating lens 70. For the same reason, mirror 51 of the FIG. 4 embodiment is also concave.

Disposed between lens 70 and mirror 71 is a prism 74 or other dispersive element whereby the laser emission can be dispersed into its various wavelength components. Since each wavelength will impinge upon mirror 71 at a unique angle, only that wavelength which impinges perpendicularly will be returned to the active volume and thereby stimulate further emission at that wavelength. Thus, by simply pivoting mirror 71 about its pivot pin 76, it is possible to selectively reflect radiation of a desired wavelength through the resonant cavity and thereby spectrally tune the output of the dye laser. Preferably, mirror 71 is slightly transparent to the fluorescence spectrum of the organic dye solution so as to permit extraction of the dye laser emission from the cavity for utilization. It should be apparent that, in addition to prisms and the like, diffraction gratings, pellicles, etalons, and various filters (e.g., interference, electrooptic, acoustooptic, etc.) could be used to spectrally tune the dye laser output.

While the invention has been described with particular reference to preferred embodiments, it should be apparent that various modifications and changes can be made without departing from the spirit and scope of the invention as defined by the appended claims.

We claim:
1. Apparatus capable of stimulating the emission of continuous-wave coherent radiation from a fluorescent organic dye solution containing organic dye molecules having a triplet-state lifetime less than

$$\frac{\lambda^4 F(\lambda)}{8\pi \, c\tau N^2 k_{ST} \sigma_T \lambda_l} \text{ seconds}$$

where $\lambda$ is the wavelength of the coherent radiation; $F(\lambda)$ is the magnitude of the spontaneous fluorescence lineshape function at wavelength $\lambda$ when $F(\lambda)$ is normalized so that $\int_0^\infty F(\lambda) \, d\lambda = \phi$,
where $\phi$ is the quantum yield for fluorescence; $c$ is the velocity of light in free space; $N$ is the refractive index of the solution; $k_{ST}$ is the intersystem crossing rate constant; $\tau$ is the fluorescence lifetime; and $\sigma T(\lambda)$ is the molecular absorption cross-section for triplet-triplet transitions at the laser wavelength $\lambda$; said apparatus comprising:
  a focused resonant cavity comprising first and second reflective means spaced from one another, at least one of said reflective means being effectively concave towards the other and having a radius of curvature not greater than a length substantially equal to the spacing between said reflective means;
  means for maintaining at least a portion of such a solution in the vicinity of the center of curvature of said effectively concave reflective means;
  means for focusing excitation radiation emanating from a source of continuous-wave radiation having spectral characteristics adapted to excite the dye molecules in said portion at a power density sufficient to produce a critical inversion in said portion during which said dye molecules spontaneously emit radiation, said cavity being shaped to redirect a sufficient percentage of such spontaneously emitted radiation back through said portion to stimulate the emission of radiation from said portion and produce laser action therein: and
  means for continuously dissipating thermal energy produced during the excitation of said portion, from the vicinity of said portion to maintain sufficient optical homogeneity of said solution to permit focusing of said excitation radiation at the power density required for said critical inversion, and to permit said sufficient percentage of said stimulated radiation to be redirected back through said portion to produce laser action 2. The apparatus of claim 1 wherein at least one of said reflective means is at least partially transparent to said excitation radiation for admitting excitation radiation into said portion.

3. The apparatus of claim 1 wherein said cavity has a substantially hemispherical configuration.

4. The apparatus of claim 1 wherein said maintaining means comprises a substantially enclosed cell for containing said solution, said cell having a wall which is substantially transparent to said excitation radiation for admitting excitation radiation into said portion.

5. The apparatus of claim 4 wherein at least one of said reflective means comprises a wall of said cell.

6. The apparatus according to claim 1 wherein said dissipating means comprises a heat sink positioned in the vicinity of the center of curvature of said effectively concave reflective means.

7. The apparatus according to claim 1 wherein said cavity has an optical axis and said dissipating means comprises means for flowing said solution in a direction substantially perpendicular to said optical axis.

8. A laser comprising:
  an active liquid medium comprising fluorescent organic dye molecules and a triplet quencher for said molecules dissolved in a solvent;
  an external source of continuous-wave radiation having spectral characteristics adapted to excite the molecules of said liquid medium;
  means for concentrating continuous-wave radiation from said external source within said liquid medium at a power density sufficient to excite a sufficient number of said organic dye molecules to produce a population inversion, in which radiation is spontaneously emitted by said excited molecules;
  reflective means comprising a focused resonant cavity for redirecting a predetermined percentage of said emitted radiation back through said liquid medium to sustain laser action;
  means for dissipating thermal energy from said liquid medium at a rate sufficient to maintain the optical homogeneity of said liquid medium at a level permitting continuous laser action; and
  means for abstracting said emitted radiation from said cavity for utilization.

9. The laser according to claim 8 wherein said dissipating means is operatively coupled with said reflective means.

10. The laser according to claim 9 wherein said dissipating means comprises a member having a coefficient of thermal conductivity exceeding $3.0 \times 10^{-2}$ cal/cm - sec. °C.

11. The laser according to claim 10 wherein said member comprises a material selected from the group consisting of sapphire and diamond.

12. The laser according to claim 8 wherein said organic dye molecules are selected from the group consisting of rhodamine 6G, rhodamine B, dichlorofluorescein, tetrachlorofluorescein and disodium fluorescein.

13. The laser according to claim 8 wherein said external source of continuous-wave radiation comprises a continuous-wave laser.

14. The laser according to claim 8 wherein said solvent comprises water having a deaggregating compound dissolved therein for preventing said organic dye molecules from aggregating.

15. The laser according to claim 8 wherein said focused resonant cavity comprises a spaced pair of reflective means, at least one of said reflective means being effectively concave toward the other and having an effective radius of curvature not greater than the spacing between said reflective means.

16. The laser according to claim 15 wherein said dissipating means comprises a heat sink positioned in the vicinity of the center of curvature of said effectively concave reflective means.

17. The laser according to claim 15 wherein said resonant optical cavity has a substantially hemispherical configuration, the other of said reflective means being a plane mirror positioned in the vicinity of the center of curvature of said effectively concave reflective means.

18. A method for stimulating the emission of coherent radiation from an active liquid medium comprising organic dye molecules in a solvent, said method comprising the steps of:

providing a resonant optical cavity comprising a spaced pair of reflective means, at least one of said reflective means being effectively concave toward the other and having a radius of curvature not greater than a length substantially equal to the spacing between said reflective means;

positioning at least a portion of said active medium in the vicinity of the center of curvature of said effectively concave reflective means;

maintaining the triplet state lifetime of the organic dye molecules situated in said portion at a value less than $$\frac{\lambda^4 F(\lambda)}{8\pi \tau c N^2 k_{ST} \sigma_T(\lambda)} \text{ seconds}$$

where $\lambda$ is the wavelength of said coherent electromagnetic radiation; $F(\lambda)$ is the magnitude of the spontaneous fluorescence lineshape function at wavelength $\lambda$ when $F(\lambda)$ is normalized so that $\int_0^\infty F(\lambda) d\lambda = \phi$,
where $\phi$ is the quantum yield for fluorescence; $c$ is the velocity of light in free space; N is the refractive index of the solution; $k_{ST}$ is the intersystem crossing rate constant; $\tau$ is the fluorescence lifetime; and $\sigma_T(\lambda)$ is the molecular absorption cross-section for triplet-triplet transitions at the laser wavelength $\lambda$;

directing radiant energy having spectral characteristics adapted to excite the dye molecules into said portion at a power density sufficient to produce a critical inversion in which a substantial fraction of the dye molecules in said portion are excited to a metastable state in which radiation is spontaneously emitted from said portion, said reflective means serving to redirect a sufficient percentage of said spontaneously emitted radiation back through said portion at a power density sufficient to produce laser action; and dissipating thermal energy from said medium at a rate sufficient to maintain the optical index of the medium sufficiently homogeneous so that said power densities are maintained at levels sufficient to sustain continuous laser action.

19. The method of claim 18 wherein said dissipating step comprises positioning a heat sink in the vicinity of the center of curvature of said effectively concave reflective means.

20. The method of claim 19 wherein said maintaining step further comprises flowing the medium through said cavity in a direction substantially perpendicular to a line connecting said spaced pair of reflective means.

21. Apparatus for use with a fluorescent organic dye solution capable of fluorescing over a continuum of wavelengths and a continuous-wave source of radiation having spectral characteristics capable of exciting the molecules of the dye solution to higher vibrational-rotational energy levels, said apparatus comprising:

a. a focused resonant cavity including first and second reflective elements spaced from one another, each of said elements being at least partially reflective to the radiation stimulated in said cavity, said reflective elements being shaped to redirect the stimulated radiation back and forth through a diffraction limited waist located between said reflective elements;

b. means for positioning such dye solution in the vicinity of said diffraction limited waist;

c. means for focusing the excitation radiation emanating from the source of continuous-wave radiation in the vicinity of said diffraction limited waist at a power density sufficient to excite a sufficient number of molecules of the dye solution in said vicinity to produce the critical population inversion required for laser action;

d. means for maintaining the optical homogeneity of the dye solution in the vicinity of said diffraction limited waist at the level required to sustain continuous laser action from the dye solution; and e. a tuning means, including a lens and a dispersive element for causing oscillation within said cavity at a single or a few of the fluorescing wavelengths of the dye solution.

22. The invention according to claim 21 wherein said optical homogeneity maintaining means comprises means for dissipating thermal energy from the vicinity of said diffraction limited waist at a rate which permits passage of a sufficient percentage of the redirected radiation to sustain laser action.

23. The invention according to claim 22 wherein said dissipating means comprises means for flowing the dye solution through said cavity in the vicinity of said diffraction limited waist.

24. Apparatus capable of stimulating the emission of continuous-wave coherent radiation, said apparatus comprising:

a fluorescent organic dye solution containing organic dye molecules, said organic dye molecules having a triplet-state lifetime maintainable at a predetermined value less than $$\frac{\lambda^4 F(\lambda)}{8\pi c \tau N^2 k_{ST} \sigma_T(\lambda)} \text{ seconds}$$

where $\lambda$ is the wavelength of the coherent radiation, $F(\lambda)$ is the magnitude of the spontaneous fluorescence lineshape function at wavelength $\lambda$ when $F(\lambda)$ is normalized so that $\int_0^\infty F(\lambda) d\lambda = \phi$,
where $\phi$ is the quantum yield for fluorescence, c is the velocity of light in free space, N is the refractive index of the solution, $k_{ST}$ is the intersystem crossing rate constant, $\tau$ is the fluorescence lifetime, and $\sigma_T(\lambda)$ is the molecular absorption cross-section for triplet-triplet transitions at the laser wavelength $\lambda$;

a resonant optical cavity having a pair of spaced mirrors shaped to redirect radiation, spontaneously emitted and amplified by excited molecules of said dye solution, back and forth through a diffraction limited waist located between said mirrors;

a source of continuous-wave radiation having spectral characteristics adapted to excite said dye molecules;

means for maintaining the triplet-state lifetime of the dye molecules in said vicinity of said diffraction limited waist at said predetermined value;

means for focusing radiation emanating from said source in said vicinity of said diffraction limited waist and at a power density sufficient to cause the molecules in said vicinity to spontaneously emit and amplify radiation; and means for dissipating thermal energy, produced during the lasing excitation of the dye molecules, at a rate which maintains an optical homogeneity of the dye solution that permits a sufficient percentage of the amplified radiation to be redirected back and forth through said diffraction limited waist to sustain continuous laser action.

25. The invention according to claim 24 wherein said source of continuous wave radiation comprises a continuous-wave laser, and said active liquid medium has an absorption spectrum at least partially overlapping the emission spectrum of said laser.

26. The invention according to claim 25 wherein the active medium of said continuous-wave laser comprises argon ions.

27. A spectrally tunable laser capable of continuous-wave operation, said laser comprising:

an active liquid medium including fluorescent organic dye molecules dissolved in a deaggregating solvent, which molecules, when excited, undergo transitions during which there is an emission of radiation over a continuum of wavelengths, said solvent being substantially transparent to the radiation absorbed and emitted by the excited dye molecules;

a focused resonant cavity having an internal focus and including (1) means for receiving said liquid medium in the vicinity of said internal focus and (2) means for selectively redirecting back to said vicinity a percentage of the amplified radiation, of a predesired wavelength emitted from said received liquid medium, sufficient to produce laser action from said received liquid medium at said predesired wavelength and for transmitting a small percentage of the amplified radiation of said predesired wavelength;

an external source of continuous-wave radiation having spectral characteristics adapted to excite said dye molecules of said liquid medium;

means for concentrating the continuous wave radiation emanating from said external source in the vicinity of said internal focus and at a power density sufficient to cause said dye molecules in said vicinity to spontaneously emit and amplify radiation;

means for preventing the absorption of said amplified radiation by triplet state molecules from reaching a rate sufficient to extinguish laser action; and means for dissipating thermal energy from dye molecules at said vicinity at a rate which maintains an optical homogeneity of said dye molecules which permits passage of a sufficient percentage of said redirected radiation to sustain continuous laser action.

28. The laser defined in claim 27 wherein said cavity has an optical axis and said dissipating means comprises means for flowing said liquid medium in a direction substantially perpendicular to said optical axis.

29. The laser defined in claim 27 wherein said preventing means comprises a triplet quencher for said organic dye molecules.

30. The apparatus defined in claim 27 wherein both said preventing means and said dissipating means comprise means for flowing said dye solution through said internal focus.

* * * * *

UNITED STATES PATENT OFFICE
CERTIFICATE OF CORRECTION

Patent No. 3,913,033          Dated October 14, 1975

Inventor(s) Sam A. Tuccio and Otis G. Peterson

It is certified that error appears in the above-identified patent and that said Letters Patent are hereby corrected as shown below:

Column 11, line 4 in the continuation of the table, under "Solvent", "cyclooctrate" should read -- cyclooctratet --.

Column 15, line 11, "15" should read -- 16 --.

Column 16, line 66, "♂" should read -- ♂ --.

Signed and Sealed this

[SEAL]

eighteenth Day of May 1976

Attest:

RUTH C. MASON
*Attesting Officer*

C. MARSHALL DANN
*Commissioner of Patents and Trademarks*